United States Patent [19]
Duckworth et al.

[11] Patent Number: 5,619,190
[45] Date of Patent: Apr. 8, 1997

[54] TRAINABLE TRANSMITTER WITH INTERRUPT SIGNAL GENERATOR

[75] Inventors: Paul C. Duckworth; Kurt A. Dykema; Mark L. Zeinstra, all of Holland, Mich.

[73] Assignee: Prince Corporation, Holland, Mich.

[21] Appl. No.: 427,112

[22] Filed: Apr. 21, 1995

Related U.S. Application Data

[62] Division of Ser. No. 209,947, Mar. 11, 1994.

[51] Int. Cl.$^6$ ............................ G05B 19/02; G08C 19/00
[52] U.S. Cl. .................... 340/825.22; 340/825.31; 340/825.69; 341/176
[58] Field of Search ................. 340/825.22, 825.31, 340/825.69, 825.72; 341/176; 455/234.1, 250.1; 375/345

[56] References Cited

U.S. PATENT DOCUMENTS

| | | |
|---|---|---|
| Re. 29,525 | 1/1978 | Willmott . |
| 3,196,440 | 7/1965 | Weinstein . |
| 3,337,992 | 8/1967 | Tolson . |
| 4,178,549 | 12/1979 | Lendenbach et al. . |
| 4,197,503 | 4/1980 | Dini . |
| 4,201,944 | 5/1980 | Beunders . |
| 4,241,870 | 12/1980 | Marcus . |
| 4,247,850 | 1/1981 | Marcus . |
| 4,360,801 | 11/1982 | Duhame . |
| 4,385,296 | 5/1983 | Tsubaki et al. . |
| 4,447,808 | 5/1984 | Marcus . |
| 4,482,947 | 11/1984 | Zato et al. . |
| 4,509,093 | 4/1985 | Stellberger . |
| 4,529,980 | 7/1985 | Liotine et al. . |
| 4,535,333 | 8/1985 | Twardowski . |
| 4,546,326 | 10/1985 | Van Uffelen et al. . |
| 4,550,311 | 10/1985 | Galloway et al. . |
| 4,573,046 | 1/1986 | Pinow . |
| 4,595,228 | 6/1986 | Chu . |
| 4,596,985 | 6/1986 | Bongard et al. . |
| 4,623,887 | 11/1986 | Welles, II . |
| 4,626,848 | 12/1986 | Ehlers . |
| 4,631,708 | 12/1986 | Wood et al. . |
| 4,635,033 | 1/1987 | Inukai et al. . |
| 4,652,860 | 3/1987 | Weishaupt et al. . |
| 4,665,397 | 5/1987 | Pinnow . |
| 4,670,746 | 6/1987 | Taniguchi et al. . |
| 4,703,359 | 10/1987 | Rumbolt et al. . |
| 4,742,565 | 5/1988 | Iwahashi . |
| 4,750,118 | 6/1988 | Heitschel et al. . |
| 4,754,255 | 6/1988 | Sanders et al. . |
| 4,771,283 | 9/1988 | Imoto . |
| 4,825,200 | 4/1989 | Evans et al. . |
| 4,825,210 | 4/1989 | Bachhuber et al. . |

(List continued on next page.)

FOREIGN PATENT DOCUMENTS 9402920  2/1994  WIPO .

OTHER PUBLICATIONS

Gail Marino, Pager and Garage Door Combination, Mar. 1990, Motorola Technical Developments, vol. 10 p. 36 (1 page).

Primary Examiner—Michael Horabik
Assistant Examiner—Edward Merz
Attorney, Agent, or Firm—Price, Heneveld, Cooper, DeWitt & Litton

[57] ABSTRACT

A trainable transceiver provides an integrated trainable transmitter and control system receiver for a vehicle electrical system. The transceiver includes an input circuit and an output circuit coupled to a controller. The transceiver also includes an interface connected between the controller and the vehicle's electrical system. The input circuit which receives RF signals includes an amplitude control for adjusting the reception range of the transceiver. The transceiver also disconnects the output circuit from the antenna in a remote control training mode or a transmitter signal detection mode. The transceiver is manually controlled to enter the remote control training mode and a transmission mode for controlling a remote device. The transceiver automatically enters the transmitter signal detection mode on a periodic basis.

16 Claims, 3 Drawing Sheets

U.S. PATENT DOCUMENTS

| | | |
|---|---|---|
| 4,866,434 | 9/1989 | Keenan . |
| 4,872,205 | 10/1989 | Smith . |
| 4,878,052 | 10/1989 | Schulze . |
| 4,881,148 | 11/1989 | Lambropoulos et al. . |
| 4,890,108 | 12/1989 | Drori et al. . |
| 4,905,279 | 2/1990 | Nishio ............... 340/825.69 |
| 4,912,463 | 3/1990 | Li . |
| 4,929,877 | 5/1990 | Clark et al. . |
| 4,953,305 | 9/1990 | Van lente et al. . |
| 4,978,944 | 12/1990 | Andros et al. . |
| 4,988,992 | 1/1991 | Heitschel et al. . |
| 5,028,919 | 7/1991 | Hidaka . |
| 5,065,423 | 11/1991 | Gaskill . |
| 5,123,008 | 6/1992 | Beesley . |
| 5,126,686 | 6/1992 | Tam . |
| 5,136,548 | 8/1992 | Claar et al. . |
| 5,182,551 | 1/1993 | Goto . |
| 5,227,780 | 7/1993 | Tigwell ............... 340/825.72 |
| 5,235,327 | 8/1993 | Igarashi et al. . |
| 5,261,119 | 11/1993 | Cahill . |
| 5,262,769 | 11/1993 | Holmes . |
| 5,266,945 | 11/1993 | Peek et al. . |
| 5,379,453 | 1/1995 | Tigwell . |
| 5,381,138 | 1/1995 | Stair et al. ............... 340/825.44 |
| 5,408,698 | 4/1995 | Serizawa et al. . |
| 5,442,340 | 8/1995 | Dykema ............... 340/825.22 |
| 5,475,366 | 12/1995 | Van Lente et al. . |
| 5,479,155 | 12/1995 | Zeinstra et al. ............... 340/825.22 |

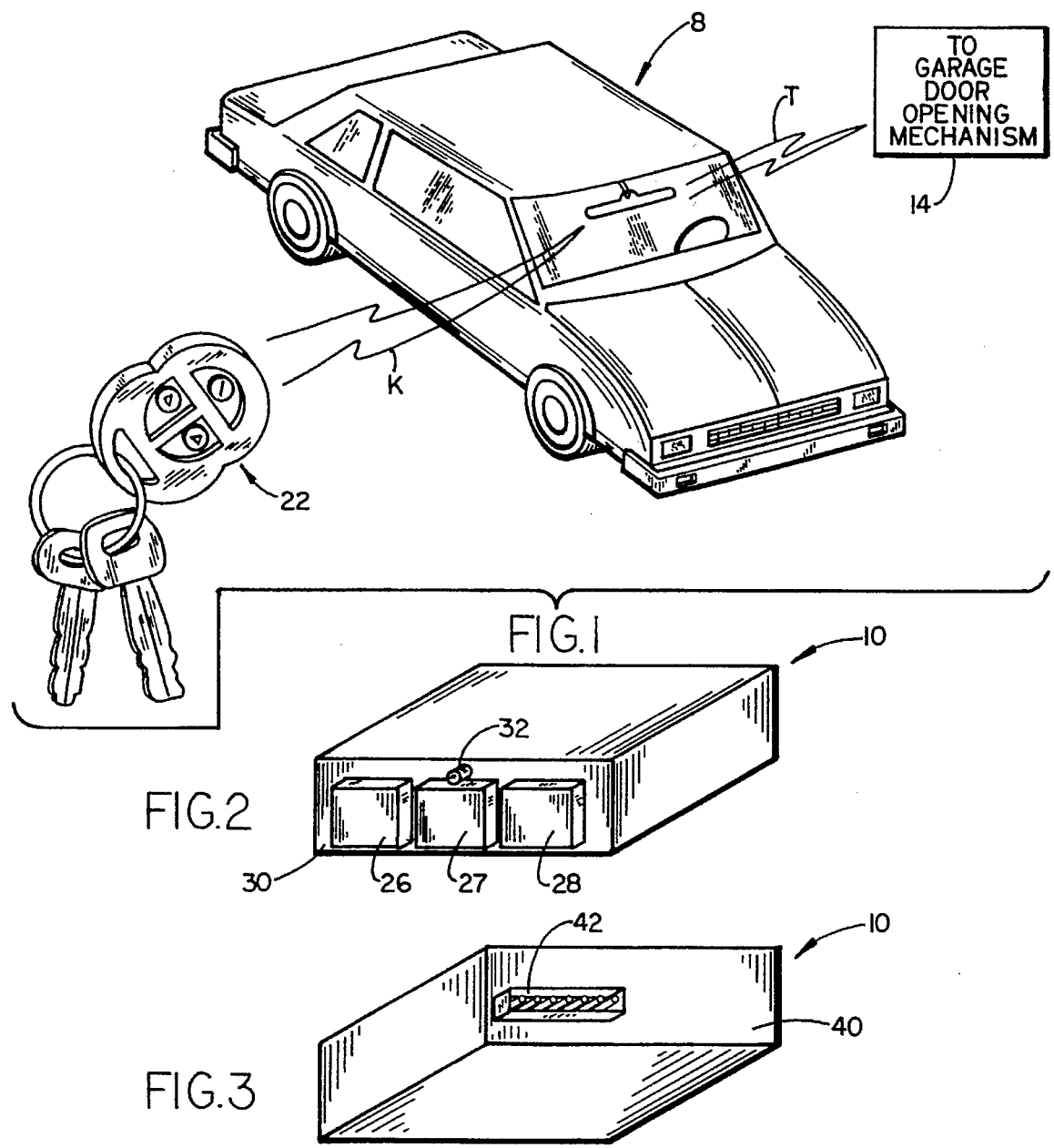

TRAINABLE TRANSMITTER WITH INTERRUPT SIGNAL GENERATOR

RELATED APPLICATION

This is a division of application Ser. No. 08/209,947, filed Mar. 11, 1994 pending. This application is related to U.S. patent application Ser. No. 08/055,509 entitled TRAINABLE RF TRANSMITTER INCLUDING ATTENUATION CONTROL filed Apr. 30, 1993, in the name of Kurt Dykema, now U.S. Pat. No. 5,442,340, which is a continuation-in-part of application Ser. No. 07/874,361 entitled VEHICLE ACCESSORY TRAINABLE TRANSMITTER, filed on Apr. 24, 1992, now U.S. Pat. No. 5,479,155, which is a continuation-in-part of allowed application Ser. No. 07/567,390 entitled ELECTRICAL CONTROL SYSTEM FOR VEHICLE OPTIONS, filed on Aug. 14, 1990, the disclosures of which are incorporated herein by reference thereto.

BACKGROUND OF THE INVENTION

The invention relates to a control system for a vehicle, and more particularly, to a system for controlling vehicle options responsive to a keyless entry remote control signal and for learning and selectively transmitting control signals for actuating a garage door opening mechanism.

Keyless entry systems including a remote keyless entry (RKE) transmitter which transmits a radio frequency (RF) control signal and a vehicle receiver which detects the RF control signal from the RKE transmitter to control vehicle door locks responsive thereto are well known. RF remote controls for actuating garage door mechanisms from a vehicle are also well known. These systems typically include separate circuitry since the garage door opening remote control is typically a transmitter which is mounted within a housing that the car owner may store in the vehicle, but is not integrated into the vehicle electrical system whereas the keyless entry receiver includes an RF receiver which is integrated into the vehicle electrical system. The separate circuitry is also necessary because the garage door opening mechanism and the keyless entry system operate at different frequencies, have different signaling formats, and use different security codes.

A novel keyless entry receiver and a garage door opener remote control is disclosed in U.S. patent application Ser. No. 07/567,390 entitled ELECTRICAL CONTROL SYSTEM FOR VEHICLE OPTIONS, filed Aug. 14, 1990, which is incorporated hereinabove by reference, and assigned to the same assignee as the immediate invention. The system of U.S. patent application Ser. No. 07/567,390 has an integrated trainable transceiver which receives RF signals from garage door opener remote control in a learning mode and transmits a garage door opener remote control signal which it has previously learned for actuating a garage door opener mechanism without the separate remote control in a transmit mode. The trainable transceiver also receives a keyless entry control signal from an RF RKE transmitter. Although this trainable transceiver provides improved versatility and operating characteristics over prior art trainable transmitters, still further improvements in the operating characteristics of an integrated trainable transceiver and keyless entry receiver are desired. Thus, it remains desirable to improve the signal-to-noise characteristics of the transceiver. It is also desirable to improve transceiver characteristics in the receive modes for the keyless entry operation and garage door opener operation. Because the transceiver operates when the vehicle's engine is not running, it is also desirable to improve the power consumption characteristics of the trainable transceiver.

SUMMARY OF THE INVENTION

The present invention provides a transceiver having an improved integrated trainable transmitter and vehicle operation control system for a vehicle. The transceiver includes an input circuit receiving radio frequency signals from a garage door opener remote control in a training mode and from a separate transmitter in a transmitter detection mode. The transceiver also includes an output circuit generating radio frequency signals for actuating a device controlled by the remote control. A controller detects signals from the input circuit and controls the output circuit while an interface circuit couples the controller to the vehicle's electrical system for controlling vehicle options in response to received signals.

According to a first aspect of the invention, the input circuit includes an amplitude control which is used to adjust the sensitivity (i.e., reception range) of the transceiver. According to another aspect of the invention, the transceiver disconnects the output circuit from an antenna associated therewith when the controller is in a remote control training mode or a reception mode. According to another aspect of the invention, the controller is responsive to a first input signal to operate in a receive mode, to a second user initiated control signal to operate in a transmit mode, and to a third signal which is automatically generated for initiating reception of a signal from said remote transmitter.

The system according to the invention integrates a trainable remote control for actuating devices remote from the vehicle and a receiver to control a vehicle option responsive to a signal from a remote transmitter. The input circuit amplifier variable gain adjusts the circuit such that it has a significantly less sensitivity in remote control training mode than in a transmitter signal reception mode. The system also has a significantly improved signal to noise ratio for received signals by eliminating noise which may otherwise be conveyed from the output circuit to the input circuit of the transceiver. The system also provides more versatile operation, allowing user control as well as automatic power control, thereby effecting power savings.

These and other aspects, features and advantages of the present invention will become apparent upon reading the following description thereof, together with reference to the accompanying drawings in which:

BRIEF DESCRIPTION OF THE DRAWINGS

FIG. 1 is a pictorial view of a vehicle including a transceiver according to the present invention;

FIG. 2 is a perspective view of a receiver housing according to the invention;

FIG. 3 is an opposite perspective view of a transceiver housing according to FIG. 2;

DETAILED DESCRIPTION OF THE PREFERRED EMBODIMENTS

Figure 4:
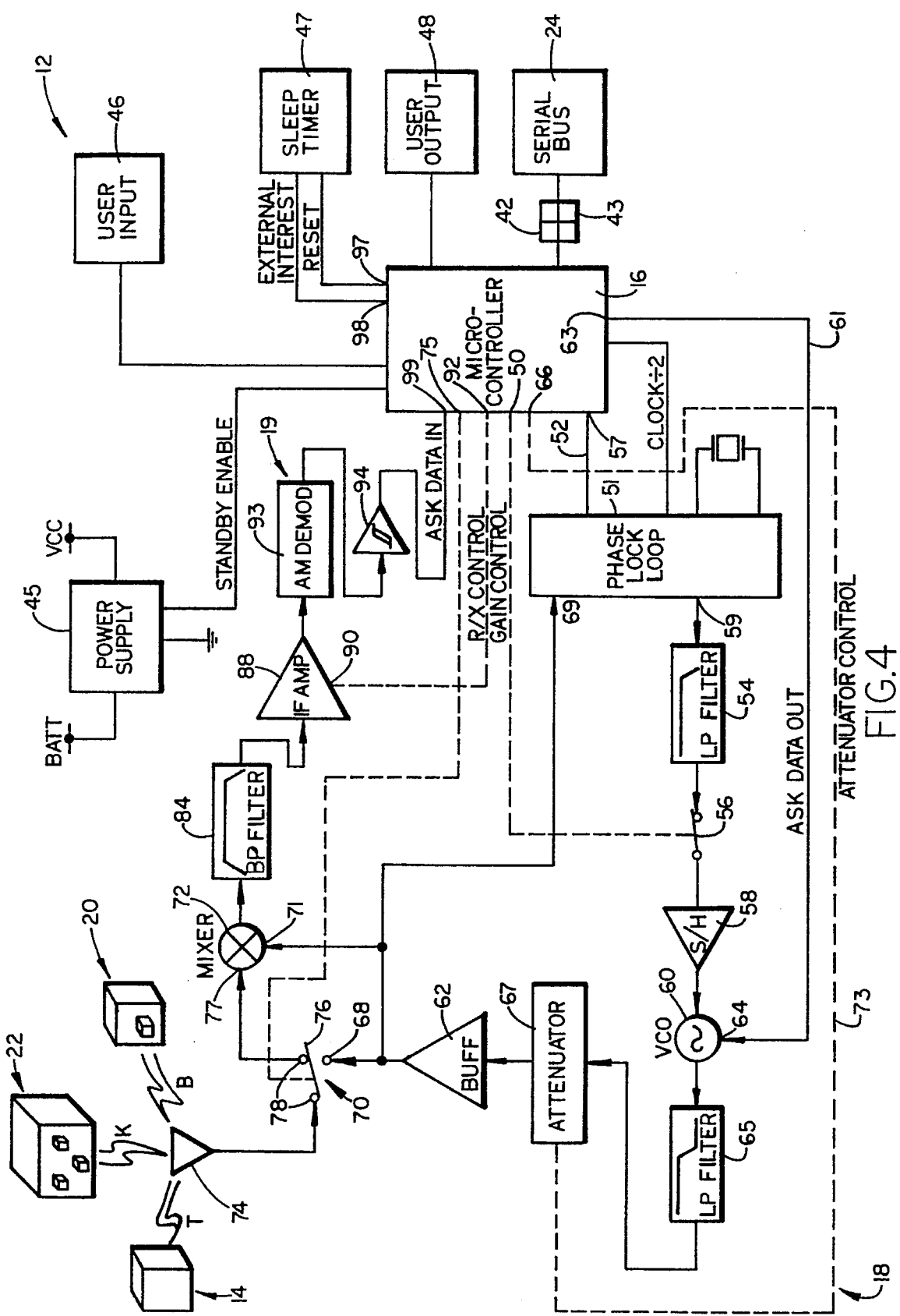
FIG. 4 is a circuit schematic of the transceiver according to the invention shown in block diagram form.

Referring initially to FIGS. 1–3, a vehicle 8 is illustrated including a transceiver 12 according to the invention. The invention is integrated into a small, generally square module housing 10. Housing 10 encloses a transceiver 12 (FIG. 4) which selectively transmits coded radio frequency (RF) energy, as indicated by arrow "T" to a device controlled by an RF control signal, such as a garage door opening mechanism 14 shown in block form in FIGS. 1 and 4. The conventional garage door opening mechanism 14 includes a receiver and control circuit (not shown) which responds to the control signal "T" for opening and closing a garage door. Transceiver 12 includes a programmable microcontroller 16 (FIG. 4) which controls an RF output circuit 18 to generate signal "T." Signal "T" has a frequency and code learned from signal "B" transmitted by existing remote control transmitter 20 and identified by transceiver 12 in a training mode, as described in greater detail in U.S. patent application Ser. No. 07/874,361, incorporated hereinabove by reference thereto. The transceiver, after learning the carrier frequency, format and code of signal "B," can transmit remote control signal "T" to activate the garage door opening control mechanism 14 without further need for the remote control transmitter 20. Transmitter 20 is typically provided with garage door opening mechanism 14 and generates control signal "B" for remotely actuating the garage door opening mechanism, but suffers from the storage and use problems described in co-pending patent application Ser. No. 07/567,390, incorporated hereinabove by reference.

Transceiver 12 also responds to control signals "K" from keyless entry remote control 22. An RF input circuit 19 demodulates signal "K" and outputs control signals to the vehicle electrical system responsive thereto. For example, the keyless entry remote control may control vehicle door locks, a trunk lock and a gas door cover. Responsive to signal "K," the microcontroller outputs a control signal to serial bus 24 which controls the vehicle accessories or options according to the input control code.

Housing 10 is small, such that it may be integrated into a variety of accessories in the vehicle, such as in a rearview mirror, an overhead console, a map light, a visor, the instrument panel, or any other suitable location in the vehicle. The transmitter includes three switches 26, 27 and 28 in a front panel face 30. Each switch is associated with a respective channel, and each channel stores a respective RF control signal in a training mode for remotely actuating one device. For example, the three channels may have three signals associated with three respective garage door opening mechanisms. Alternatively, two of the channels can have signals for two, respective, garage door openers, and the third channel can have a signal for controlling an interior house light, exterior house lights, or the like.

Each of switches 26–28 is used both to train and to actuate its respective channel. For example, if one of these switches is held for less than a predetermined period (e.g., less than 5 seconds), transceiver 12 will transmit the signal stored for that channel. If the switch is held for longer than the predetermined time period, microcontroller 16 will enter the training mode for the control channel associated with that held switch. An LED 32 is provided on front panel face 30 to inform the operator of the operational mode. For example, the LED is illuminated continuously while a signal is being transmitted, flashes in the training mode, and flashes at a rate five times faster than the training mode rate when the training mode is finished.

It is envisioned that a fourth switch (not shown) can be provided on housing 10 which is actuated to initialize a training mode for transceiver 12 whereby the trainable transceiver learns transmitter signal "K" from a new transmitter which can be used after training to control vehicle options.

The back panel 40 includes a connector 42 for connection to the vehicle electrical system serial bus 24. This connector 42 mates with a complementary connector 43 (FIG. 4), which is coupled to a vehicle serial bus 24, when the housing is installed in the vehicle. The serial bus may, for example, be a multiplexing bus having two, four, ten or more conductors and connected to a main microcontroller (not shown) for the vehicle electrical system. The microcontroller 16 thus communicates with vehicle accessories through the multiplex bus on the vehicle. It will be appreciated by those skilled in the art that microcontroller 16 may be connected to the vehicle electrical system microcontroller or it may be connected directly to the vehicle options being controlled, as will be required by the vehicle electrical system.

Although the overall preferred mounting environment is described with respect to the generally square housing 10, transceiver 12 according to the invention may be used in other environments. For example, the improved transmitter of the immediate invention may be used as an integral part of a rearview mirror such as that disclosed in U.S. patent application Ser. No. 07/567,390, the disclosure of which is incorporated hereinabove by reference thereto, or as an integral part of a sun visor, an overhead console, or the like.

Having briefly described the overall preferred mounting environment and operation of transmitter 12, and its relationship to a vehicle, a detailed description of the preferred embodiment is now presented in connection first with the circuit diagram of FIG. 4, and subsequently with reference to the flow diagram of FIG. 5.

Operation of transceiver 12 is controlled by microcontroller 16. Transceiver 12 includes a power supply 45, a user input 46 for controlling the microcontroller 16, an interrupt circuit 47 generating an external interrupt and responsive to a reset signal for restarting a timer in the interrupt circuit, a user output 48 providing information to the operator, and a connector 42 connected to serial bus 24, which in turn is connected to the vehicle electrical system. An RF signal input circuit 19 and the RF signal output circuit 18 are connected to microcontroller 16 for receiving and transmitting RF signals.

The user input 46 (FIG. 4) and the user output 48 provide an operator interface. The user input includes switches 26–28 (FIG. 2) which are disclosed in U.S. Pat. No. 5,442,340 or the switches disclosed in U.S. patent application Ser. No. 07/567,390 entitled ELECTRICAL CONTROL SYSTEM FOR VEHICLE OPTIONS. As described above, switches 26–28 provide operator actuated control of the training and transmitting mode for the trainable transceiver 12 (FIG. 4) which controls device 14 without remote control 20. The user output 48 includes visual indicator 32 or a vacuum fluorescent display as disclosed in application Ser. No. 07/567,390. The visual indicator 32 indicates the operating mode of the trainable transceiver by constant illumination or various flashing rates. If the system is used with a compass or a thermometer, the user output 48 may include an alpha-numeric display. The alpha-numeric display would provide additional information such as vehicle heading and outside temperature information, as described in parent application Ser. No. 07/567,390. Microcontroller 16 is also connected to power supply 45, which provides a regulated supply voltage and a standby enable signal. Power supply 45 and the standby enable signal are described in U.S. Pat. No. 5,442,340, incorporated herein by reference thereto.

The RF signal output circuit 18 includes a phase locked loop circuit 51 connected to the frequency output 57 of microcontroller 16 through a parallel data bus 52. The phase locked loop circuit 51 is implemented using any suitable integrated circuit such as the Motorola MC145106, driven by an 8 MHz oscillator. The phase locked loop 51 is responsive to the frequency selection signals at output 57 of microcontroller 16 to generate a DC signal at output 59.

The output signal at output 59 of the phase locked loop circuit 51 is filtered in lowpass filter 54. The output of the lowpass filter is connected to a switch 56. Switch 56 is connected to output 50 of microcontroller 16. A sample-and-hold circuit 58 is connected to switch 56 and holds the signal output from the low-pass filter during a frequency selection interval. The sample-and-hold circuit may be implemented using any suitable means such as an IC No. 4066 switch, a capacitor and an amplifier.

The output of sample-and-hold circuit 58 is the DC control signal for a voltage controlled oscillator (VCO) 60. The frequency of the oscillating signal output by VCO 60 is set by the DC signal output from sample-and-hold circuit 58. The VCO includes a switch (not shown), which may be implemented using a transistor, and which is switched on and off under the control of a data signal at input 64. Input 64 is connected to output 63 of microcontroller 16 by conductor 61. The VCO enable signal at output 63 switches VCO 60 on and off according to data signals stored in microcontroller 16, which data is learned in the garage door opener remote control training mode.

The signal output by VCO 60 is filtered in lowpass filter 65. The amplitude of the signal output by the lowpass filter is controlled by an attenuator 67. Attenuator 67 is preferably implemented by a plurality of series circuits, each of which comprises a respective transistor (not shown) and a resistor (not shown) connected in series between the output of VCO 60 and ground. The attenuator is connected to output 66 of microcontroller 16 through a data bus 73. Data bus 73 has a respective conductor for each series circuit in attenuator 67. The transistors are each connected to a respective conductor of bus 73 such that they are selectively turned on and off under the control of microcontroller 16. The output signal of the attenuator 67 is input to a buffer 62. Buffer 62 may be implemented by any suitable buffer circuit, such as a unity gain amplifier or an emitter-follower transistor configuration. The output of buffer 62 is connected to one terminal 68 of a switch 70, an input 69 of phase locked loop 51, and to one input 71 of a mixer 72.

Switch 56 is controlled such that the signal output from filter 54 is momentarily input to the sample-and-hold circuit 58 at the beginning of a frequency select interval. When a new frequency is output, or if the sample-and-hold circuit requires refreshing, the switch is closed and the signal output from lowpass filter 54 is sampled again. This control of switch 56 prevents oscillation or other variations of the control signal input to VCO 60. Accordingly, the VCO 60 will generate a stable output signal during the frequency interval. The output of buffer 62 is an oscillating signal having a carrier frequency set by the signal on parallel data bus 52.

The transceiver 12 includes an antenna 74 which is connected to contact 76 of switch 70. Switch 70 is coupled to output 75 of microcontroller 16. The switch may be implemented by any suitable switch such as a relay driven by the output signal of microcontroller 16. Switch 70 is controlled by signals from microcontroller 16 such that the contact 76 connects antenna 74 to terminal 78 in the receive state. In the transmit state, the contact connects antenna 74 to terminal 68. The switch is thus used to selectively isolate the antenna 74 from the output of the buffer 62 in the receive state, thereby enhancing circuit performance by reducing noise in the received signal which would otherwise result from the coupling of the input and output circuits.

Although transceiver 12 preferably includes a single antenna 74, those skilled in the art will recognize that two antennae (not shown) could be used: one for the RF signal input circuit and one for the RF signal output circuit. If such separate antennae are provided, a respective switch (not shown) would be connected between each antenna and its associated circuit. The switches would then be controlled such that only one is closed at any given time.

The RF signal input circuit 19 includes mixer 72, which has a first input 77 connected to contact 76 and a second input 71 connected to the output of buffer 62. The mixer combines the signal detected by antenna 74 with the oscillating signal output by buffer 62. The output signal of the mixer 72 is filtered by bandpass filter 84. The bandpass filter 84 removes noise from the output of the mixer 72. The filtered signal is input to an intermediate frequency amplifier 88 having a gain control input 90. Gain control input 90 is connected to output 92 of microcontroller 16. The IF amplifier 88 may be implemented using any suitable means such as an amplifier with a variable feedback impedance. The gain control input signal varies the amplifier gain between three levels. The amplifier is controlled to have a high gain level for receiving signals from transmitter 22 and a low gain when training to a signal B from remote control 20. The IF amplifier 88 has a low gain when transceiver 12 is in a training mode to reduce the sensitivity of the receiver, and thereby lower the range, such that only those signals transmitted from a source within a radius of approximately 1 to 10 feet are detected. This insures that the transceiver learns a signal from the desired remote control and does not detect signals from any nearby RF transmitters. In a transmitter detection mode, for inputting a signal from transmitter 22, the gain of amplifier 88 is controlled to provide tire transceiver with a significantly greater sensitivity. This allows transceiver 12 to detect a signal from a keyless entry transmitter 22 while the user is still several car lengths away from vehicle 8 (FIG. 1). When transceiver 12 (FIG. 4) is not in the training mode or the transmitter detection mode, the gain of the IF amplifier can be controlled to be at substantially 0 dB, to prevent noise from the receive circuit being input to controller 16.

The output of the IF amplifier 88 is input to an AM demodulator 93. The output of demodulator 93 is input to a data amplifier 94. The data amplifier includes a comparator which compares the signal output from the demodulator 93 to a fixed reference signal. If the output of demodulator 93 exceeds the reference signal, the comparator outputs a high logic level signal. Otherwise, the comparator outputs a low logic level signal. The output of the data amplifier 94 is connected to input 99 of microcontroller 16.

The interrupt circuit, or sleep timer, 47 is connected to input 98 and output 97 of microcontroller 16. The sleep timer is connected to input 98 of microcontroller 16. Sleep timer 47 is implemented using any suitable low power consumption timer which outputs a timer interrupt signal a predetermined time period after it is reset by the reset signal from microcontroller 16.

Figure 5:
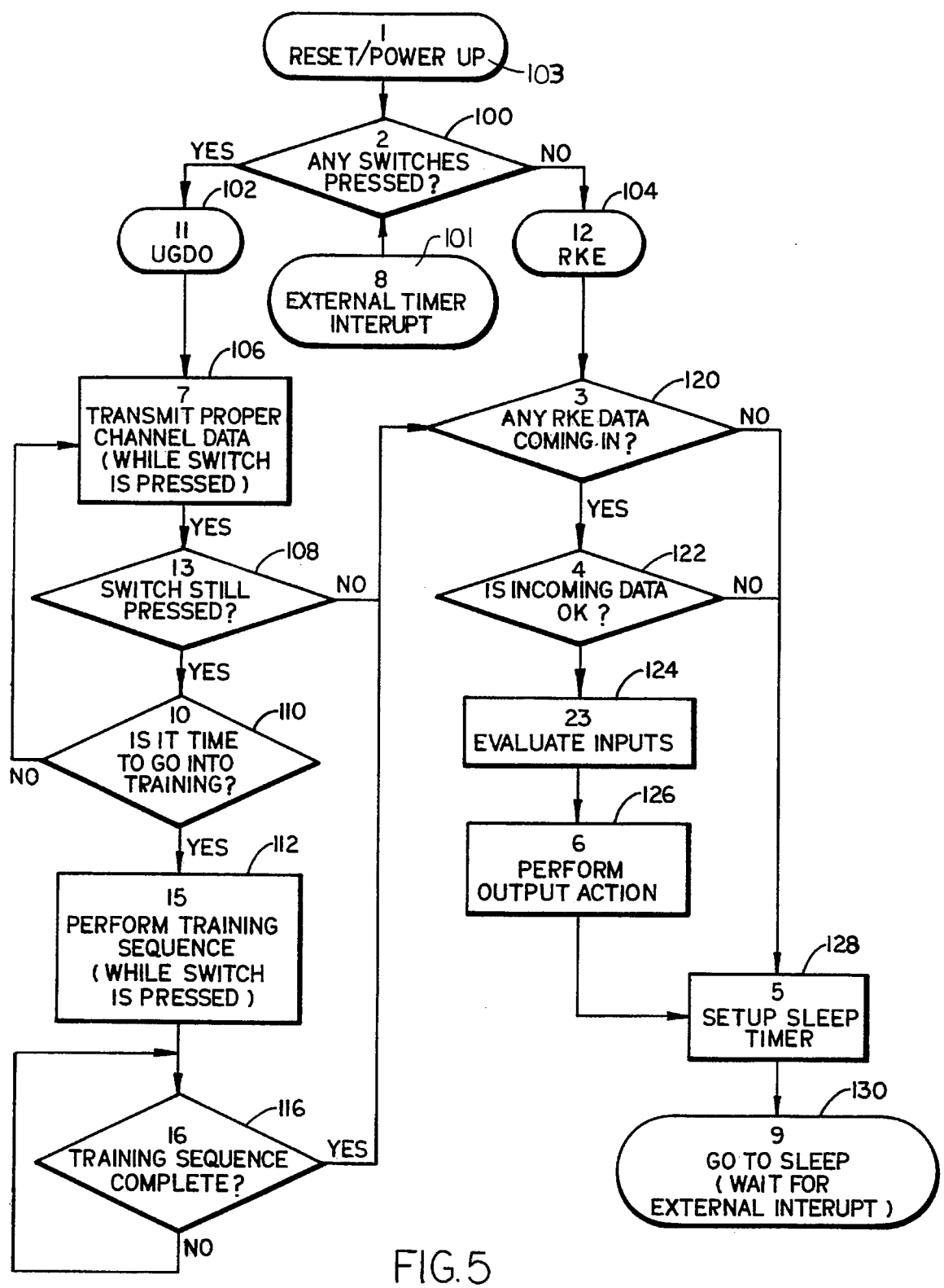
FIG. 5 is a flow diagram of the program for controlling the operation of the transceiver according to FIG. 4.

The circuit represented by FIG. 4 is a self-contained trainable transmitter for the environment illustrated in FIG. 1. It will be recognized that the user interface and microcontroller 16 will include additional inputs and outputs when utilized in the environment illustrated in FIG. 2 of application Ser. No. 07/567,390. The main programs for the microcontroller 16 of trainable transceiver 12 is shown in co-pending patent application Ser. No. 07/567,390 and U.S. Pat. No. 5,479,155, the disclosures of which are incorporated herein by reference thereto. Accordingly, those programs will not be described in greater detail herein.

The reset/power-up operation will now be described with reference to FIG. 5 and the circuit of FIG. 4. Microcontroller 16 initiates transmit/receive state control following an external interrupt generated by the sleep timer 47, upon power-up of microcontroller 16, or when one of switches 26–28 is actuated. Microcontroller 16 (FIG. 4) first determines whether one of switches 26–28 (FIG. 2) is actuated, as indicated in block 100 (FIG. 5). If one of switches 26–28 was actuated, microcontroller 16 determines that the transmit/receive operation to be performed pertains to the garage door opener remote control operation, as indicated in block 102. If one of switches 26–28 is not actuated, microcontroller 16 determines that the transmitter was powered up or that interrupt timer 47 generated an interrupt signal, as indicated in block 104.

If microcontroller 16 determines that one of switches 26–28 is actuated, the microcontroller transmits a signal as indicated in block 106. To transmit an signal, microcontroller 16 outputs a signal at output 75 which controls switch contact 76 to connect antenna 74 to buffer 62 through terminal 68. Microcontroller 16 then outputs a control signal at output 57 which controls the phase locked loop 50 to output a DC signal which drives the VCO 60 to have a desired carrier frequency which was previously stored in association with the one of the switches 26–28 which is actuated. Microcontroller 16 also outputs a data signal at output 63 which controls voltage controlled oscillator 60 to turn on and off according to the data signals stored for that actuated switch.

As indicated in decision block 108, microcontroller 16 continues to monitor the actuated switch, while the transceiver is transmitting the signal. If microcontroller 16 determines that the switch is actuated for longer than a predetermined minimum time period (e.g., 5 seconds), the microcontroller switches to a training mode, as determined in block 110. The microcontroller then performs the training routine, as indicated in block 112, and which is described in greater detail in U.S. Pat. No. 5,479,155. In the training routine, the microcontroller outputs a signal at output 75 which controls contact 78 to connect antenna 74 to input 77. The microcontroller also outputs a signal at output 92 which controls the output amplitude of the IF amplifier 88 to be at a low level which limits the reception range of the transceiver during the training mode. The microcontroller also controls the phase locked loop to generate those carrier frequency signals at which garage door opening mechanism remote controls are known to operate (e.g., in the range between approximately 200 MHz and 400 MHz). Microcontroller 16 remains in the training mode until the training operation is completed, as determined in block 116.

If the actuated switch was released before the predetermined minimum time period is finished as determined in block 108, or upon completion of the training sequence as determined in block 116, or if it was determined in decision block 100 that one or more of the switches 26–28 were not actuated, microcontroller 16 performs a remote transmitter detection operation. To detect incoming data, microcontroller 16 outputs a signal on output 53 which controls VCO 60 to output a signal at the frequency of keyless entry transmitter 22. For example, the microcontroller outputs a signal which controls the output circuit to generate a signal at 310 MHz if the RKE transmitter operates at 310 MHz. Microcontroller 16 also outputs a control signal at output 92, which controls the RF input circuit IF amplifier to have a high gain, and a signal at output 75, which controls contact 75 to connect antenna 74 to input 77 of mixer 72. Microcontroller 16 then monitors input 78 to determine whether any data is being output by the comparator, as indicated in decision block 120. If data is detected, microcontroller 16 determines whether the data corresponds to a particular identification code stored in microcontroller 16 or whether the data has an appropriate signal to noise ratio, as indicated in block 122. If the data corresponds to a code stored in microcontroller 16, the microcontroller evaluates the inputs thereto as indicated in block 124. The inputs evaluated include the serial bus and any other input which would effect how an output action is to be taken. For example, if the serial bus indicates that all the doors are unlocked when remote transmitter 22 command is to unlock the doors, microcontroller 16 would not have to unlock the doors. The microcontroller would effect illumination of the vehicle interior by controlling switches (not shown) to connect the interior lamps (not shown) to the vehicle battery (not shown). The microcontroller is thus responsive to the input conditions and the control signals received from transmitter 22 to perform a selected output action at block 126.

Following a decision in block 120 that data is not incoming from transmitter 20, or a decision in block 122 that the data is not OK, or following an action in block 126, microcontroller 16 puts itself in a sleep mode to conserve power. In the sleep mode, the microcontroller has limited operating functions which lower the power consumption of the transceiver. In this mode, the microcontroller periodically monitors the inputs thereto to determine if an interrupt signal has been generated by the interrupt timer 47 or if one of the switches 26–28 has been actuated. To enter the sleep mode, microcontroller 16 first outputs a reset signal at output 97 which is input to the timer as indicated in block 128. This reinitializes the timer. The microcontroller then goes to sleep as indicated in block 130. When the timer expires, an external interrupt is generated thereby which interrupts the microcontroller sleep mode and microcontroller 16 returns to a fully operating state, as indicated at block 100.

Thus, it can be seen that a transceiver is disclosed which provides improved control for switching between a remote keyless entry mode and a transmitter mode. The circuit has improved input amplitude control and noise suppression. Additionally, the transmitter conserves energy by operating in a sleep mode.

It will become apparent to those skilled in the art that various modifications to the preferred embodiment described and disclosed herein can be made. Such modifications will, however, fall within the spirit or scope of the invention as defined in the appended claims unless the claims by their language express state otherwise.

The embodiments of the invention in which an exclusive property or privilege is claimed are defined as follows:

1. A trainable transceiver system for a vehicle having an electrical system, comprising:

a transceiver including an input circuit for receiving radio frequency signals and an output circuit for selectively generating radio frequency signals;

a connector coupled to the vehicle electrical system;

a user interface including actuators for inputting first and second control signals;

an interrupt signal generator for generating a third control signal; and a controller coupled to said input circuit, said output circuit, said connector, said user interface, and said interrupt signal generator, wherein said controller controls said transceiver to operate in a transmit mode responsive to said first signal from said user interface, said controller controls the transceiver to operate in a training mode responsive to said second control signal from said user interface, and said controller controls the transceiver to enter a transmitter signal detection mode responsive to said third control signal, wherein said input circuit includes an amplitude control circuit having an amplitude control input coupled to said controller, said controller providing an amplitude control signal for selectively varying the gain of said amplitude control circuit to decrease the sensitivity of said input circuit when said transceiver is operating in the training mode for receiving remote control signals from a remote control.

2. The transceiver system as defined in claim 1, wherein said interrupt signal generator includes an interrupt timer which periodically generates an interrupt signal to which said interrupt signal generator responds by generating said third control signal.

3. The transceiver system as defined in claim 2, wherein said controller initializes said interrupt timer upon entering a sleep mode whereby said interrupt timer interrupts the sleep mode automatically at the end of a sleep interval by generating said interrupt signal.

4. The transceiver system as defined in claim 3, wherein said user interface includes at least one switch.

5. The transceiver system as defined in claim 4, wherein said first control signal is generated when said switch is held for a first predetermined time period.

6. The transceiver system as defined in claim 5, wherein said second control signal is generated when said switch is held for a second predetermined time period.

7. The transceiver system as defined in claim 6, wherein said controller controls said transceiver to enter a transmitter signal detection mode following said training mode or said transmit mode.

8. The trainable transceiver system as defined in claim 1, wherein said amplitude control circuit fully attenuates a signal input thereto when said transceiver is not operating in the transmitter signal detection mode or in the training mode.

9. The trainable transceiver system as defined in claim 1, wherein said amplitude control circuit includes a variable gain amplifier.

10. The trainable transceiver system as defined in claim 9, wherein said variable gain amplifier has a gain control input coupled to said controller, and wherein said amplitude control signal is input to said gain control input such that said input circuit has a lower sensitivity when said transceiver is in the training mode to learn the remote control signal from the remote control and a greater sensitivity when the transceiver is receiving a signal from a remote transmitter while in the transmitter signal detection mode.

11. The trainable transceiver system as defined in claim 9, wherein said variable gain amplifier fully attenuates a signal input thereto when said transceiver is not in the transmitter signal detection mode or in the training mode.

12. The trainable transceiver system as defined in claim 1, wherein said amplitude control circuit includes a variable attenuator.

13. The trainable transceiver system as defined in claim 12, wherein said variable attenuator is coupled to said controller, and wherein said amplitude control signal is input to said variable attenuator such that said input circuit has a lower gain when the transceiver is in the training mode and a higher gain when the transceiver is in the transmitter signal detection mode.

14. The trainable transceiver system as defined in claim 13, wherein said variable attenuator fully attenuates a signal input thereto when said transceiver is not in the transmitter signal detection mode or in the training mode.

15. The trainable transceiver system as defined in claim 1 and further including an antenna and a switch for selectively connecting said output circuit to said antenna, said control circuit coupled to said switch to control said switch.

16. The trainable transceiver system as defined in claim 15, wherein said switch is coupled to an input of said input circuit and to an output of said output circuit, said switch responsive to said controller for connecting said antenna to said input of said input circuit when said transceiver is receiving a signal.

* * * * *